US012631523B2

(12) United States Patent　　　　　(10) Patent No.: US 12,631,523 B2
Furukawa　　　　　　　　　　　　　(45) Date of Patent: May 19, 2026

(54) DRAINAGE STRUCTURE FOR GAS SENSOR

(71) Applicant: SUBARU CORPORATION, Tokyo (JP)

(72) Inventor: Toshihiko Furukawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 307 days.

(21) Appl. No.: 18/215,597

(22) Filed: Jun. 28, 2023

(65) Prior Publication Data

US 2024/0019341 A1　Jan. 18, 2024

(51) Int. Cl.
G01M 15/02　　(2006.01)
G01M 15/10　　(2006.01)

(52) U.S. Cl.
CPC .......... G01M 15/02 (2013.01); G01M 15/102 (2013.01)

(58) Field of Classification Search
CPC . G01M 15/02; G01M 15/102; G01N 27/4077
See application file for complete search history.

(56) References Cited

U.S. PATENT DOCUMENTS

| | | | | | |
|---|---|---|---|---|---|
| 4,916,934 | A * | 4/1990 | Nagata | ............... | G01N 27/4077 73/31.05 |
| 6,346,179 | B1 * | 2/2002 | Makino | .............. | G01N 27/4077 204/426 |
| 7,560,012 | B2 * | 7/2009 | Shichida | ............ | G01N 27/4077 204/429 |

| | | | | | |
|---|---|---|---|---|---|
| 7,758,736 | B2 * | 7/2010 | Okumura | ........... | G01N 27/4077 204/424 |
| 8,413,483 | B2 * | 4/2013 | Yamada | ............. | G01N 27/4077 73/23.31 |
| 8,479,561 | B2 * | 7/2013 | Sekiya | ............... | G01N 27/4077 73/23.31 |
| 9,759,586 | B2 * | 9/2017 | Mori | ................... | G01N 27/4077 |
| 10,801,988 | B2 * | 10/2020 | Iwamoto | ........... | G01N 27/4071 |
| 2007/0220955 | A1 * | 9/2007 | Noda | .................. | G01M 15/102 73/23.31 |
| 2008/0067066 | A1 * | 3/2008 | Okumura | ........... | G01N 27/4077 204/424 |
| 2010/0122569 | A1 * | 5/2010 | Yamada | ............. | G01N 27/4077 73/31.05 |
| 2011/0209523 | A1 * | 9/2011 | Otsubo | .............. | G01N 27/4077 73/23.31 |

(Continued)

FOREIGN PATENT DOCUMENTS

JP　　　2008-175685　A　　7/2008

*Primary Examiner* — Freddie Kirkland, III
(74) *Attorney, Agent, or Firm* — McGinn IP Law Group, PLLC

(57)　　　　　ABSTRACT

A drainage structure for a gas sensor includes a detection element, a protector, and a drainage. The detection element is held in a housing. The detection element includes a detector that is provided in a tip end. The detector is configured to detect a specific component in gas of interest by contact of the gas of interest with the detector. The protector is secured to the housing. The protector covers the detector while ventilation is kept. The drainage has a long shape and is mounted to the protector. The drainage includes a first end disposed in the protector and a second end disposed outside the protector. The drainage is configured to produce a capillary action.

20 Claims, 5 Drawing Sheets

(56) References Cited

U.S. PATENT DOCUMENTS

| | | | |
|---|---|---|---|
| 2011/0283775 A1* | 11/2011 | Sekiya | G01N 27/4077 |
| | | | 73/31.05 |
| 2017/0138895 A1* | 5/2017 | Iwamoto | G01M 15/102 |
| 2017/0160249 A1* | 6/2017 | Brosio | G01N 33/0029 |

* cited by examiner

EXHAUST GAS

DRAINAGE STRUCTURE FOR GAS SENSOR

CROSS-REFERENCE TO RELATED APPLICATIONS

The present application claims priority from Japanese Patent Application No. 2022-111583 filed on Jul. 12, 2022, the entire contents of which are hereby incorporated by reference.

BACKGROUND

The disclosure relates to a drainage structure for a gas sensor that detects a specific component of gas of interest.

A gas sensor is mounted to an exhaust pipe extending from an engine onboard a vehicle. The gas sensor detects a concentration of nitrogen oxide ($NO_X$), oxygen ($O_2$), or the like contained in exhaust gas flowing in the exhaust pipe.

The gas sensor includes a detection element having a detector provided in a tip end and detecting the concentration of a specific component such as nitrogen oxide ($NO_X$) in the exhaust gas by contact of the exhaust gas with the detector. The detection element is held in a housing (mounting fittings) so that the detector can be exposed.

The detector in the detection element is covered with a protector secured to a tip end of the housing. Vent holes guiding the gas of interest such as exhaust gas and discharging the guided gas of interest to the outside are formed in the protector (refer to, for example, Japanese Unexamined Patent Application Publication (JP-A) No. 2008-175685).

SUMMARY

An aspect of the disclosure provides a drainage structure for a gas sensor. The drainage structure includes a detection element, a protector, and a drainage. The detection element is held in a housing. The detection element includes a detector that is provided in a tip end. The detector is configured to detect a specific component in gas of interest by contact of the gas of interest with the detector. The protector is secured to the housing. The protector covers the detector while ventilation is kept. The drainage has a long shape and is mounted to the protector. The drainage includes a first end disposed in the protector and a second end disposed outside the protector. The drainage is configured to produce a capillary action.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

In a gas sensor, when moisture contained in gas of interest guided into a protector from vent holes is cooled, condensed water accumulates in the protector. When the condensed water accumulating in the protector contacts a detection element, problems occur that the detection element vulnerable to thermal shock cracks, which causes reductions in the durability of the detection element and the detection accuracy of the detection element. Although a drainage hole for discharging the condensed water to the outside is formed in the protector, it is not easy to efficiently discharge the condensed water from this drainage hole to the outside of the protector simply by gravity.

It is desirable to provide a drainage structure for a gas sensor capable of accelerating the discharge of condensed water in a protector.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
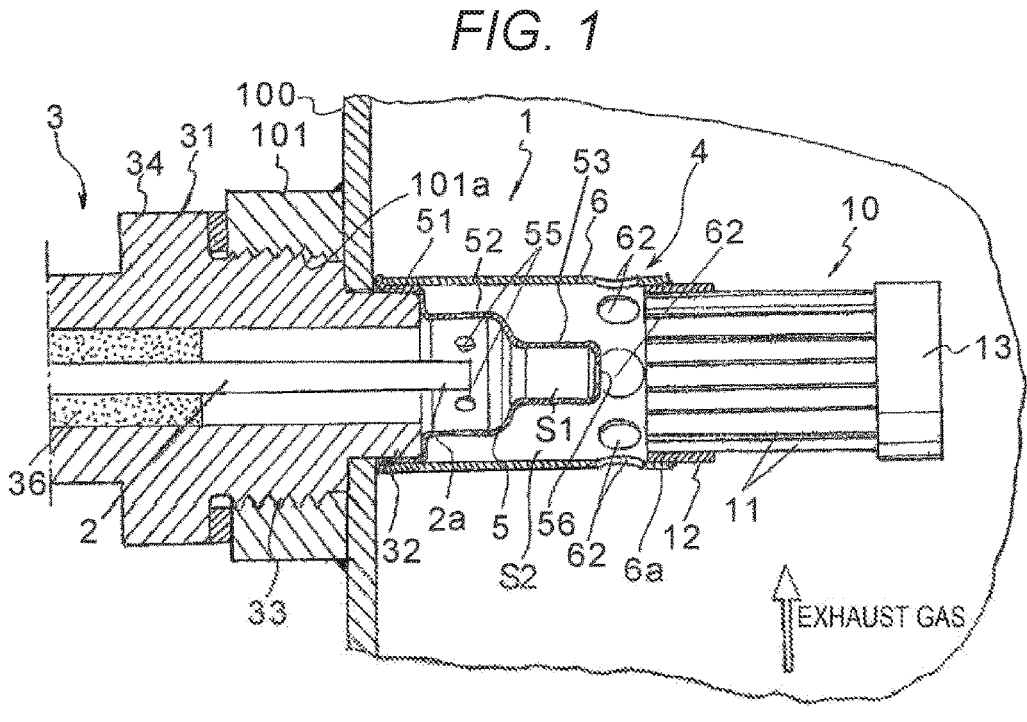
FIG. 1 is a partial cross-sectional view illustrating a state of mounting a gas sensor including a drainage structure to an exhaust pipe according to an embodiment of the disclosure.

As illustrated in FIG. 1, a gas sensor 1 according to the present embodiment is mounted to an exhaust pipe 100 extending from an engine, not illustrated, onboard a vehicle, and detects a concentration of nitrogen oxide ($NO_X$) contained in exhaust gas (gas of interest) flowing in the exhaust pipe 100 in an arrow direction of FIG. 1. This gas sensor ($NO_X$ sensor) 1 includes a detection element 2, a housing 3, a protector 4, and a drainage 10. The protector 4 covers a detector 2a of the detection element 2, to be described later, in a state of maintaining ventilation. In the present embodiment, the protector 4 includes an inner protector 5 and an outer protector 6.

The detection element 2 is an elongated rectangular plate member configured such that a solid electrolyte body such as ceramic (not illustrated) that is vulnerable to thermal shock and fragile and a detection electrode (not illustrated) mainly containing platinum are stacked. The detector 2a that detects the concentration of nitrogen oxide ($NO_X$) in the exhaust gas by contact of the exhaust gas with the detector 2a is formed on a tip end (a right end in FIG. 1) of the detection element 2.

The housing 3 includes a mounting fittings 31 for mounting the gas sensor 1 to the exhaust pipe 100 and a cylindrical outer cylinder, not illustrated, coupled to the fitting 31. The detection element 2 is inserted into an axial center of the mounting fittings 31 having a generally cylindrical shape. This detection element 2 is held by the mounting fittings 31 via a cylindrical filling member 36 configured with talc powder. It is noted that a cylindrical protector mounting member 32, a male screw 33 with a screw groove formed on an outer peripheral surface, and a hexagonal tool engagement member 34 with which a tool such as a spanner is engaged are formed together on the mounting fittings 31 in sequence from a tip end. The protector mounting member 32 is formed smaller in diameter than the male screw 33 and the tool engagement member 34.

The inner protector 5 and the outer protector 6 are members that cover the detector 2a of the detection element 2 and that protect the detector 2a from contamination due to deposits (attached substances such as fuel ashes and oil components) in the exhaust gas and from water exposure. The inner protector 5 and the outer protector 6 are disposed coaxially into a dual cylindrical structure.

The inner protector 5 is a bottomed cylindrical member, including a coupling member 51 having large and small diameters, a large-diameter member 52, and a small-diameter member 53 in sequence from a base end mounted to the housing 3 to a tip end. The outer protector 6 is formed into a straight cylindrical member at a uniform diameter. The coupling member 51 of the inner protector 5 is fitted into an outer circumference of the protector mounting member 32 of the mounting fittings 31, and one axial end (a left end in FIG. 1) of the outer protector 6 is fitted into an outer circumference of this coupling member 51. Portions where the inner protector 5 and the outer protector 6 are fitted are welded to the mounting fittings 31 by spot welding or laser welding, disposing the inner protector 5 and the outer protector 6 coaxially to configure the inner-outer dual structure.

Multiple (eight in an illustrated example) circular vent holes 55 are formed in a side wall (peripheral wall) of the large-diameter member 52 of the inner protector 5 at a uniform angle pitch (45° pitch) in a circumferential direction. The detector 2a of the detection element 2 faces an interior of this large-diameter member 52. Furthermore, one circular vent hole 56 is formed in a central portion of a bottom wall (lid) of the small-diameter member 53 narrowed from the large-diameter member 52 of the inner protector 5 to the tip end (right side in FIG. 1).

A tip end of the cylindrical outer protector 6 disposed concentrically with and radially outward of the inner protector 5 extends to the tip end (right side in FIG. 1) beyond the bottom wall of the tip end of the inner protector 5. Multiple (eight in the illustrated example) circular vent holes 62 are formed in this tip end at a uniform angle pitch (45° pitch) in the circumferential direction. In the present embodiment, a diameter of the vent holes 62 formed in the outer protector 6 is set larger than a diameter of the vent holes 55 formed in the inner protector 5. In the present embodiment, the number of vent holes 55 formed in the inner protector 5 and the number of vent holes 62 formed in the outer protector 6 are both eight herein. However, the numbers of these vent holes 55, 62 may not necessarily be the same. In addition, the numbers of the vent holes 55 and 62 are not limited to eight and may be one or more. In the present embodiment, the vent holes 55, 56, and 62 serve as discharge holes capable of discharging condensed water in the protector 4 outside.

The inner protector 5 and the outer protector 6 are mounted to the mounting fittings 31 concentrically as described above, with an inner chamber S1 formed in the inner protector 5 and an outer chamber S2 formed between the inner protector 5 and the outer protector 6. The inner chamber S1 communicates with the outer chamber S2 via the multiple vent holes 55 and one vent hole 56 formed in the inner protector 5. The outer chamber S2 communicates with an interior of the exhaust pipe 100 via the multiple vent holes 62 formed in the outer protector 6.

While the high heat-resistant, high corrosion-resistant stainless steel (such as SUS304) is used as a material for the fitting 31, the inner protector 5, and the outer protector 6 in the present embodiment, metal other than the stainless steel (SUS) can also be used for the material of these members. Furthermore, other configurations of the gas sensor 1 are well-known and not illustrated and described.

In the gas sensor 1 according to the present embodiment, the tip end of the cylindrical outer protector 6 is an opening in a circular hole shape. The drainage 10 that produces a capillary action to drain the condensed water in the outer protector 6 into the exhaust pipe 100 is mounted to this opening. The drainage 10 is formed as a long member, with a first end disposed in the protector 4 and a second end disposed outside the protector 4.

Figure 3:
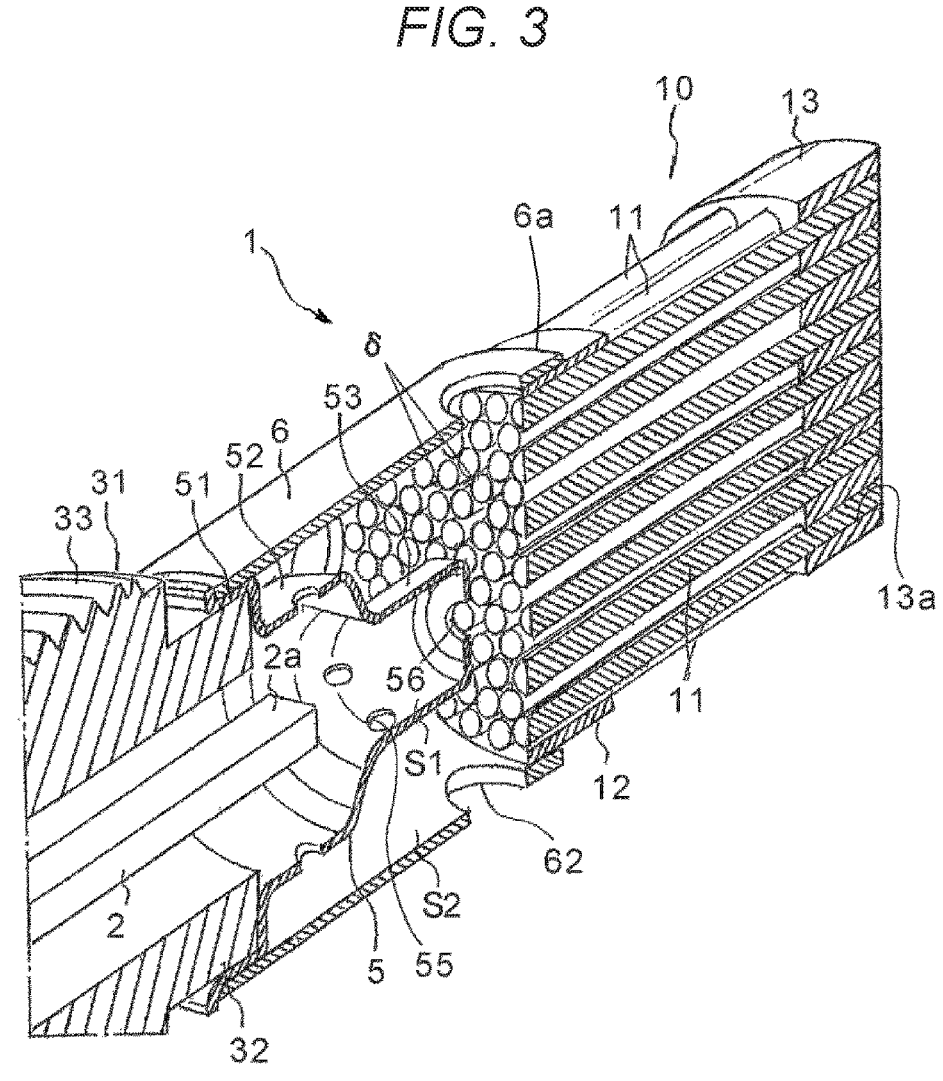
FIG. 3 is a cross-sectional perspective view taken along line A-A of FIG. 2.

In the present embodiment, the drainage 10 is configured with pillar wire rods 11. As illustrated in FIG. 3, multiple wire rods 11 are bundled to configure the drainage 10. While columnar (round rod-shaped) metal wire rods are used as an example of the wire rods 11 in the present embodiment, the wire rods 11 may be polygonal and formed from a material other than metal.

The drainage 10 further includes a fittings 12 and a binder 13. The fittings 12 is mounted to the outer protector 6 in a state of bundling axial base ends (left ends in FIGS. 1 and 2) of the multiple wire rods 11. In one embodiment, the axial base ends of the multiple wire rods 11 may serve as "first ends". In the present embodiment, the fittings 12 is configured with an annular metal band member. The binder 13 bundles axial tip ends (right ends in FIGS. 1 and 2) of the multiple wire rods 11. In one embodiment, the tip ends of the multiple wire rods 11 may serve as "second ends". In the present embodiment, the binder 13 is a metal member, having a columnar shape as illustrated in FIG. 3, and has multiple through holes 13a axially penetrating the binder 13. The tip end of each wire rod 11 is inserted into one through hole 13a of the binder 13. For example, a high heat-resistant, high corrosion-resistant stainless steel (such as SUS304) can be selected as a material for the wire rods 11, the fittings 12, and the binder 13.

Figure 2:
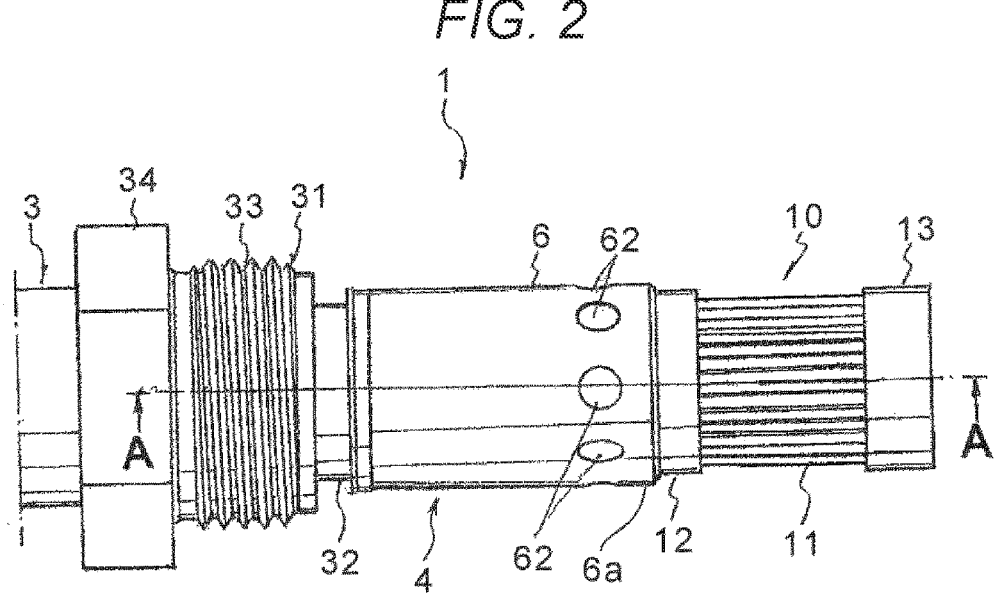
FIG. 2 is a plan view of a tip end of the gas sensor illustrated in FIG. 1.

The tip ends of the multiple wire rods 11 are inserted into and bound by the binder 13 and the axial base ends of the multiple wire rods 11 are bundled by the fittings 12, forming the drainage 10 into a generally columnar shape as a whole. As illustrated in FIGS. 1 to 3, the drainage 10 is mounted to the outer protector 6, in a state in which an end closer to the fittings 12 is inserted from an opening end 6a of the outer protector 6 and protrudes into the outer chamber S2 in the outer protector 6 by a predetermined amount. An outer circumference of the fittings 12 and an inner peripheral surface of the opening end 6a of the outer protector 6 can be bonded by, for example, welding. In a state of mounting the drainage 10 to the opening end 6a of the outer protector 6 in this way, tiny gaps 5 are formed between the adjacent wire rods 11, as illustrated in FIG. 3.

Next, a method of mounting the gas sensor 1 to the exhaust pipe 100 will be described. As illustrated in FIG. 1, the gas sensor 1 is mounted to a side of the exhaust pipe 100, with a tip end of the gas sensor 1 protruding into the exhaust pipe 100. That is, an opening is formed in the side of the exhaust pipe 100 for mounting the gas sensor 1 and a mounting boss 101 is mounted to surround this opening. The male screw 33 of the mounting fittings 31 of the gas sensor 1 is screwed into a screw hole 101a formed in this mounting boss 101. The mounting fittings 31 can screw the male screw 33 into the screw hole 101a by rotating the gas sensor 1 around an axis using a tool, not illustrated, such as a spanner engaged with the tool engagement member 34. This enables the gas sensor 1 to be mounted to the side of the exhaust pipe 100 with the tip end of the gas sensor 1 protruding into exhaust pipe 100.

The exhaust gas discharged from the engine onboard the vehicle to the exhaust pipe 100 flows in the exhaust pipe 100 in a direction indicated by an arrow in FIG. 1. In the course of the flow, part of the exhaust gas flows into the outer chamber S2 from the vent holes 62 formed in the outer protector 6. The exhaust gas flowing into the outer chamber S2 flows into the inner chamber S1 from the vent holes 55, 56 formed in the inner protector 5, and contacts the detector 2a of the detection element 2 facing the interior of the inner chamber S1, resulting in the detection of the concentration of nitrogen oxide ($NO_x$) contained in the exhaust gas.

The exhaust gas that contacts the detector 2a of the detection element 2 in the inner chamber S1 of the gas sensor 1 to detect the concentration of the nitrogen oxide ($NO_x$) flows into the outer chamber S2 from the vent holes 55, 56 formed in the inner protector 5. The exhaust gas then flows into the exhaust pipe 100 from the outer chamber S2 via the vent holes 62 formed in the outer protector 6, merges with the other exhaust gas flowing in the exhaust pipe 100, and finally discharges to the outside of the exhaust pipe 100.

In the gas sensor 1 configured as described above, the condensed water may be generated in the outer chamber S2 of the gas sensor 1 by cooling moisture contained in the exhaust gas to be equal to or lower than a condensation temperature in the gas sensor 1. Furthermore, the condensed water generated in the exhaust pipe 100 may enter the outer chamber S2 from the vent holes 62 of the gas sensor 1 due to the sway or the like of the vehicle. This condensed water discharges into the exhaust pipe 100 from the outer chamber S2 efficiently and reliably by the capillary action of the drainage 10 mounted to the outer protector 6. That is, the condensed water passes through the tiny gaps 6 (refer to FIG. 3) formed between the multiple wire rods 11 of the drainage 10, and flows away from within the outer chamber S2 to the outside of the outer chamber S2 along the wire rods 11 by the capillary action. The condensed water flowing away from within the outer chamber S2 is heated and evaporated by the hot exhaust gas flowing in the exhaust pipe 100 in the course of the flow along the wire rods 11, and discharges to the outside of the exhaust pipe 100 together with the exhaust gas.

As described above, the gas sensor 1 according to the present embodiment can encourage the condensed water to discharge by the capillary action that occurs in the drainage 10 and discharge the condensed water efficiently from the outer chamber S2 into the exhaust pipe 100 when the condensed water runs into the gas sensor 1. This can inhibit the condensed water from stagnating in the outer chamber S2. This can also inhibit the condensed water from adhering to the detector 2a of the detection element 2 and prevent the detection element 2 vulnerable to thermal shock from cracking due to rapid cooling. Therefore, it is possible to improve the durability and detection accuracy of the detection element 2.

Figure 4:
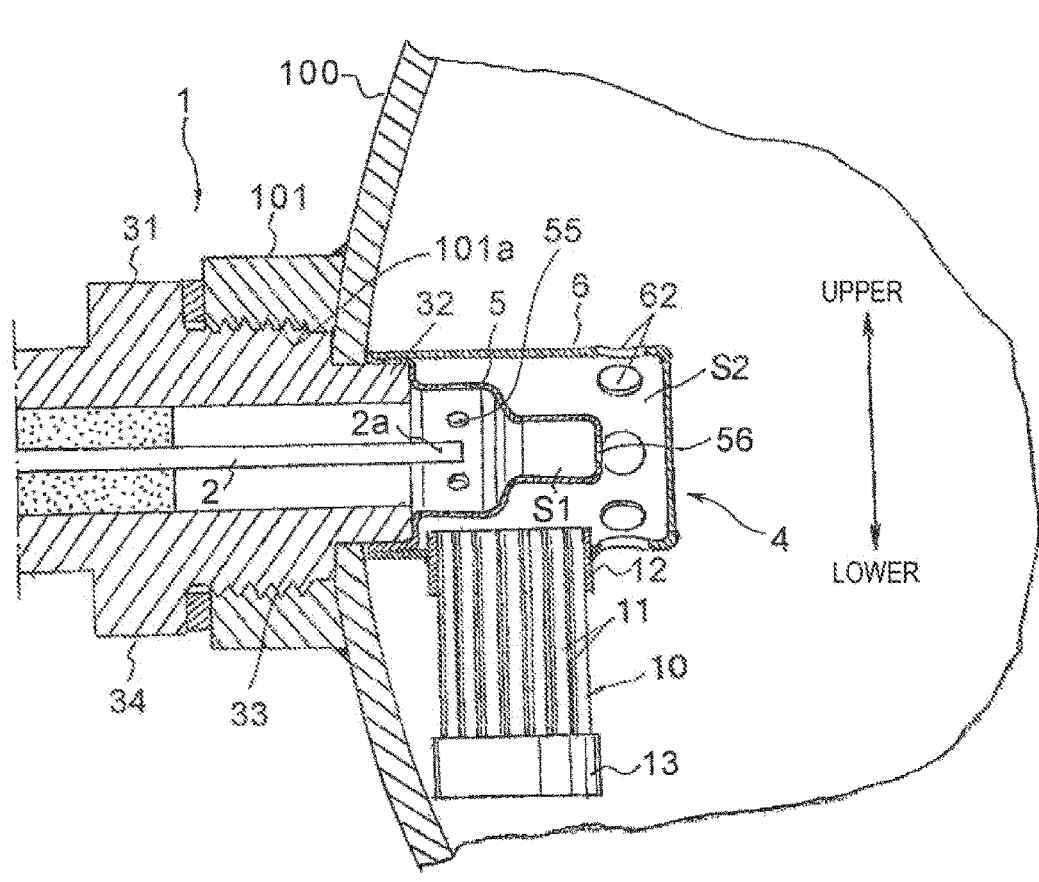
FIG. 4 is a partial cross-sectional view illustrating a state of mounting a gas sensor including a drainage structure according to a modified example of the embodiment to the exhaust pipe.

In the embodiment described so far, the drainage 10 is mounted to the outer protector 6 of the gas sensor 1 while being inserted into the opening end 6a of the outer protector 6. Alternatively, as illustrated in FIG. 4, the drainage 10 may be mounted to the outer protector 6 by being inserted into an opening formed in a lower portion (lower portion in the direction of gravity) of a side wall (peripheral wall) of the outer protector 6. When part of the exhaust gas is cooled to generate the condensed water in the outer chamber S2 in the outer protector 6, this condensed water stagnates downward in the outer chamber S2. Therefore, the drainage 10 can discharge the stagnating condensed water to the outside of the outer chamber S2.

Second Embodiment

Figure 5:
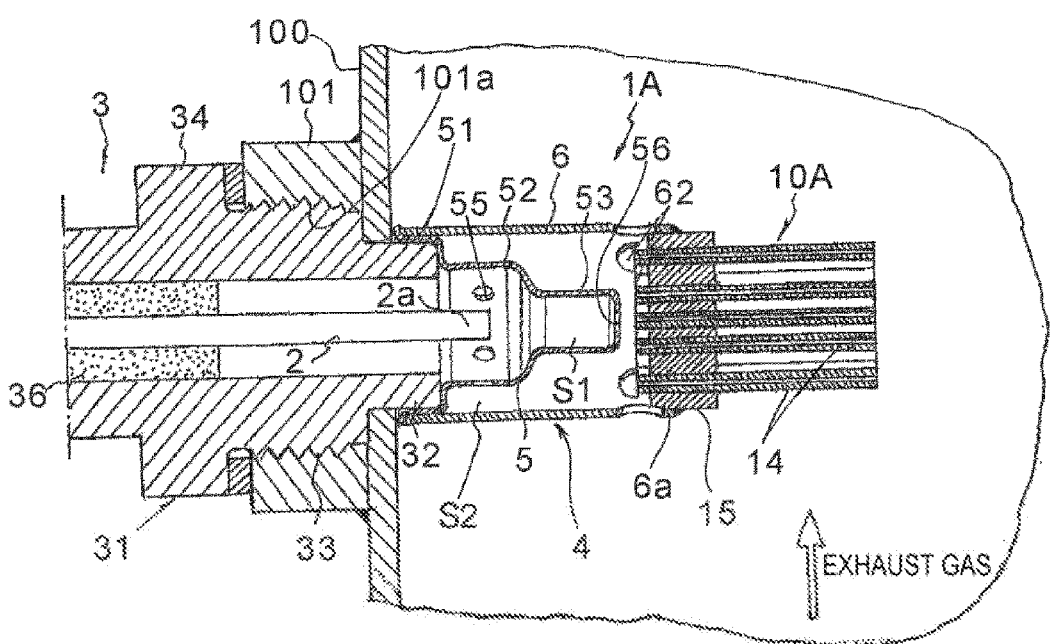
FIG. 5 is a partial cross-sectional view illustrating a state of mounting a gas sensor including a drainage structure to an exhaust pipe according to an embodiment of the disclosure.
Figure 6:
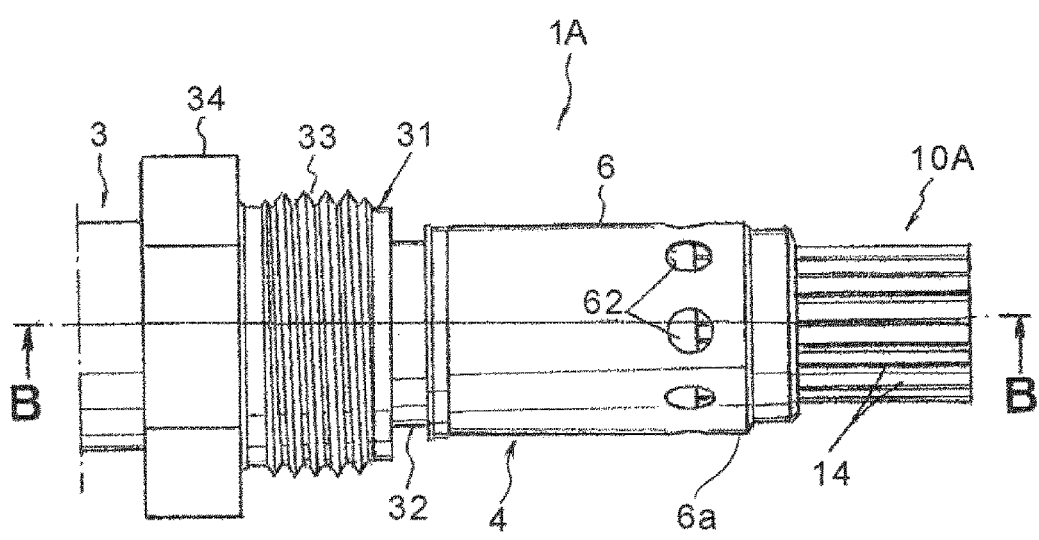
FIG. 6 is a plan view of a tip end of the gas sensor illustrated in FIG. 5.
Figure 7:
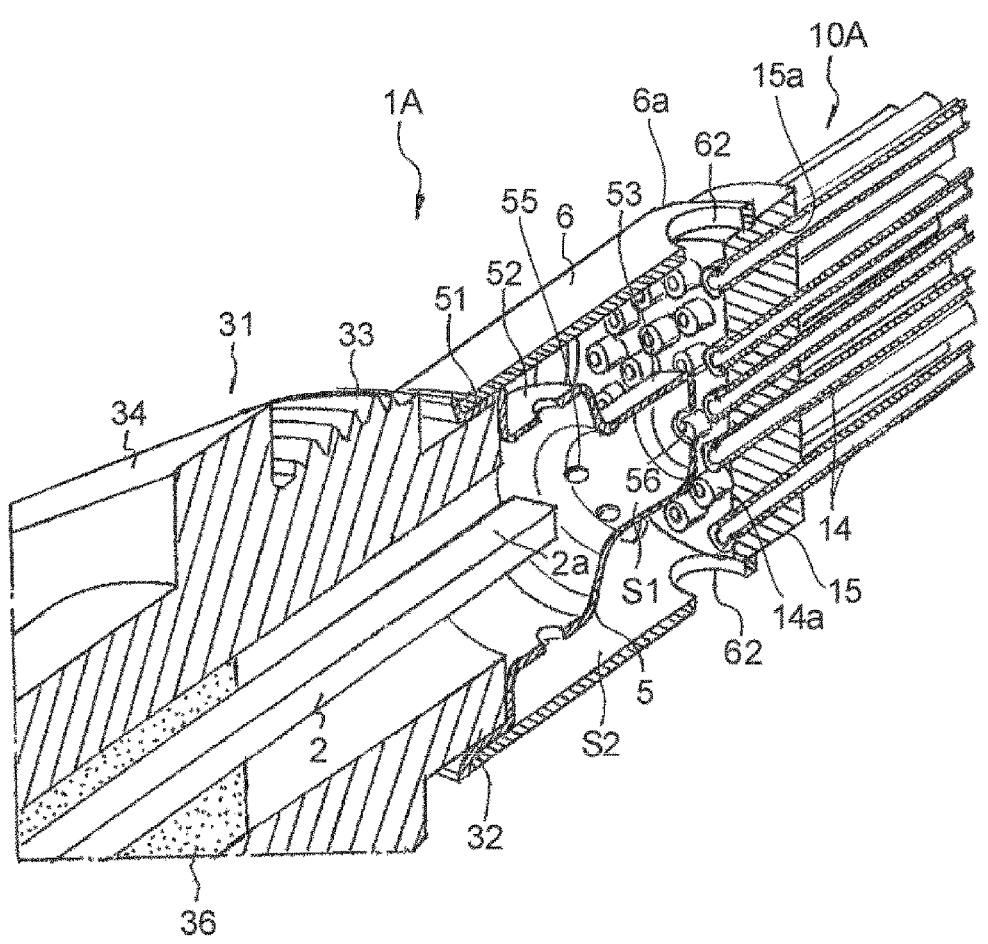
FIG. 7 is a cross-sectional perspective view taken along line B-B of FIG. 6.

A second embodiment of the disclosure will next be described with reference to FIGS. 5, 6, and 7. It is noted that in FIGS. 5 to 7, the same elements as those illustrated in FIGS. 1 to 3 are denoted by the same reference signs and not described hereinafter.

In a gas sensor 1A according to the present embodiment, multiple hollow (tubular) capillary tubes 14 are bundled to configure a drainage 10A as an alternative to the multiple pillar (solid) wire rods 11 described above. The multiple capillary tubes 14 are mounted to the opening end 6a of the outer protector 6, with base ends of the capillary tubes 14 bundled using a fittings 15. In one embodiment, the base ends of the capillary tubes 14 may serve as "first ends". The fittings 15 has a columnar shape having an outer diameter substantially equal to an inner diameter of the opening end 6a of the outer protector 6, and has multiple through holes 15a axially penetrating the fittings 15. Each capillary tube 14 penetrates one through hole 15a of the fittings 15, and a base end 14a of the capillary tube 14 protrudes from the fittings 15 and enters the outer protector 6. The capillary tubes 14 and the fittings 15 can be made of metal, for example, stainless steel. The drainage 10A is mounted to the opening end 6a of the outer protector 6 by inserting the fittings 15 into the opening end 6a.

In the present embodiment, the multiple capillary tubes 14 configuring the drainage 10A extend in parallel, and the drainage 10A has a generally columnar shape as a whole. However, a way of binding the multiple capillary tubes 14 is not limited to this. For example, the multiple capillary tubes 14 may be bundled so that gaps between the adjacent capillary tubes 14 grow from the base ends to tip ends, and the overall drainage 10A may have a generally truncated cone shape.

As for the gas sensor 1A according to the present embodiment like the first embodiment, part of the exhaust gas flows in the gas sensor 1A to cool moisture contained in the exhaust gas to be equal to or lower than the condensation temperature, generating the condensed water in the outer chamber S2 of the gas sensor 1A. This condensed water discharges into the exhaust pipe 100 outside of the gas sensor 1A from within the outer chamber S2 through the multiple capillary tubes 14 of the drainage 10A mounted to the outer protector 6 by the capillary action. At this time, in the tip end of the capillary tubes 14 through which the condensed water discharges into the exhaust pipe 100, a flow velocity of the exhaust gas flowing around the tip ends is higher than a flow velocity of the exhaust gas flowing in the outer chamber S2 of the gas sensor 1A. As a result, a pressure near the tip ends of the capillary tubes 14 becomes relatively lower than an internal pressure of the outer chamber S2 of the gas sensor 1A. Owing to this, the condensed water in the outer chamber S2 of the gas sensor 1A is drawn out by differential pressure and discharged into the exhaust pipe 100 from the capillary tubes 14 efficiently.

The condensed water discharged into the exhaust pipe 100 through the capillary tubes 14 is heated and evaporated by the hot exhaust gas flowing in the exhaust pipe 100, and discharged to the outside of the exhaust pipe 100 through the exhaust pipe 100 together with the exhaust gas.

As described above, in the present embodiment, like the first embodiment, the drainage 10A can encourage the condensed water in the protector 4 of the gas sensor 1A to discharge. This can inhibit the condensed water from adhering to the detector 2a of the detection element 2 and prevent the detection element 2 from cracking due to rapid cooling.

Figure 8:
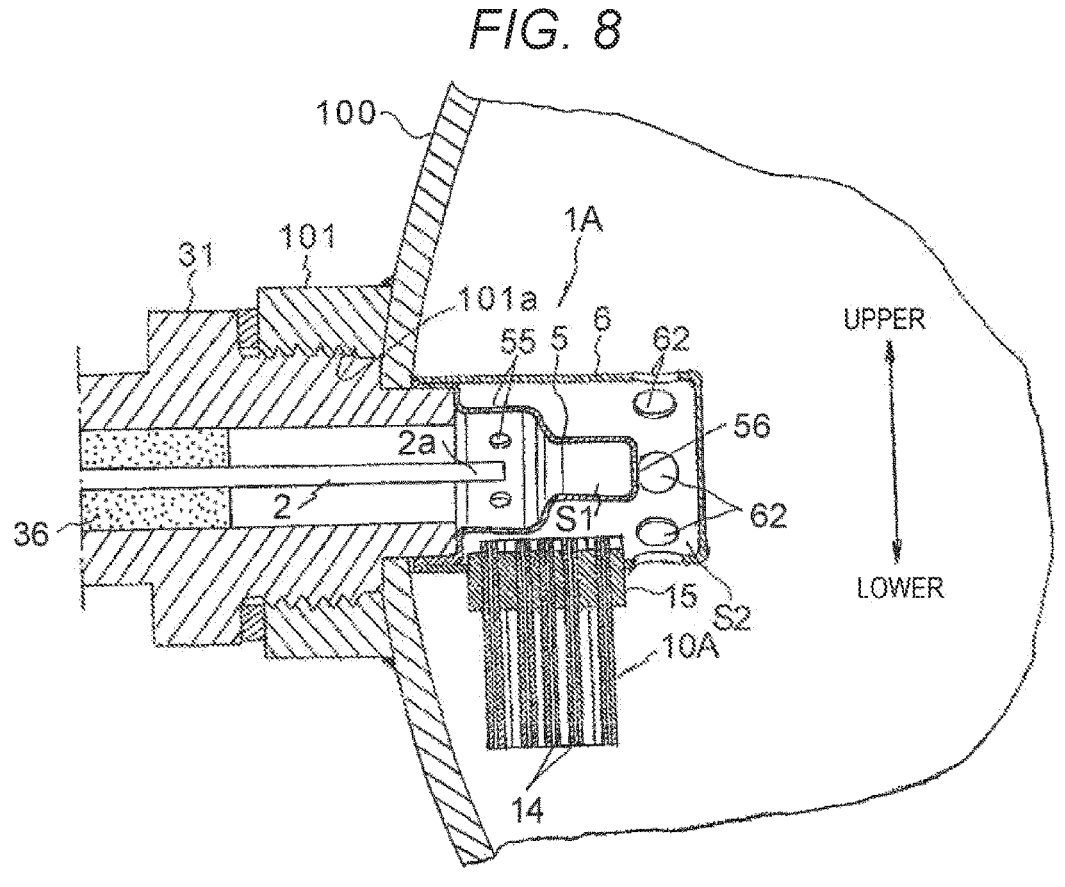
FIG. 8 is a partial cross-sectional view illustrating a state of mounting a gas sensor including a drainage structure to the exhaust pipe according to a modified example of the embodiment.

In the embodiment described above, the drainage 10A is mounted to the outer protector 6 of the gas sensor 1A while being inserted into the opening end 6a of the outer protector 6. As illustrated in FIG. 8, the drainage 10A may be mounted to a lower portion (lower portion in the direction of gravity) of the side wall (peripheral wall) of the outer protector 6. When part of the exhaust gas is cooled to generate the condensed water in the outer protector 6, this condensed water stagnates downward in the outer chamber S2. Therefore, the drainage 10A can discharge the stagnating condensed water to the outside of the outer chamber S2.

In the embodiments above, an example of applying the disclosure to the drainage structure provided in the gas sensor (NO$_X$ sensor) that detects the concentration of the nitrogen oxide (NO$_X$) contained in the exhaust gas of the engine has been described. The disclosure is similarly applicable to a drainage structure provided in a gas sensor that detects the other component in the exhaust gas, for example, a gas sensor (O$_2$ sensor) that detects the concentration of oxygen (O$_2$).

Furthermore, the disclosure is also applicable to a drainage structure for a gas sensor that detects a concentration or the like of any specific component contained in any gas of interest other than the exhaust gas of the engine.

Furthermore, in the embodiments described above, the drainage is provided to any of the opening end 6a and the side wall (peripheral wall) of the outer protector 6. Alternatively, the drainages may be provided to the opening end 6a and the side wall (peripheral wall) of the outer protector 6, respectively.

Furthermore, in the embodiments described above, the drainage 10, 10A is configured with the bundled multiple long wire rods 11 or capillary tubes 14. The drainage 10, 10A may have one or more long members that produce the capillary action.

The disclosure is not limited to the embodiments described above, and various changes and modifications may be made without departing from the spirit of the disclosure.

The invention claimed is:

1. A drainage structure for a gas sensor, the drainage structure comprising:
   a detection element held in a housing, the detection element comprising a detector that is provided in a tip end, the detector being configured to detect a specific component in gas of interest by contact of the gas of interest with the detector;

a protector secured to the housing, the protector covering the detector while ventilation is kept; and
   a drainage having a long shape and mounted to the protector, the drainage comprising a first end disposed in the protector and a second end disposed outside the protector, the drainage being configured to produce a capillary action.

2. The drainage structure for the gas sensor according to claim 1, wherein
   the drainage is configured with bundled columnar wire rods.

3. The drainage structure for the gas sensor according to claim 2, wherein
   the protector comprises an inner protector and an outer protector that are disposed concentrically to configure an inner-outer dual structure, and
   the drainage is mounted to the outer protector.

4. The drainage structure for the gas sensor according to claim 3, wherein
   the drainage is mounted to one or both of an opening end and a side wall of the outer protector having a cylindrical shape.

5. The drainage structure for the gas sensor according to claim 1, wherein
   the drainage is configured with bundled capillary tubes.

6. The drainage structure for the gas sensor according to claim 5, wherein
   the protector comprises an inner protector and an outer protector that are disposed concentrically to configure an inner-outer dual structure, and
   the drainage is mounted to the outer protector.

7. The drainage structure for the gas sensor according to claim 6, wherein
   the drainage is mounted to one or both of an opening end and a side wall of the outer protector having a cylindrical shape.

8. The drainage structure for the gas sensor according to claim 1, wherein
   the protector comprises an inner protector and an outer protector that are disposed concentrically to configure an inner-outer dual structure, and
   the drainage is mounted to the outer protector.

9. The drainage structure for the gas sensor according to claim 8, wherein
   the drainage is mounted to one or both of an opening end and a side wall of the outer protector having a cylindrical shape.

10. A vehicle comprising the drainage structure for the gas sensor according to claim 1.

11. A drainage structure for a gas sensor, the drainage structure comprising:
   a detection element held in a housing, the detection element comprising a detector that is provided in a tip end, the detector being configured to detect a specific component in gas of interest by contact of the gas of interest with the detector;
   a protector secured to the housing, the protector covering the detector while ventilation is kept; and
   a drainage having an elongated shape and mounted to the protector, the drainage comprising a first end disposed in the protector and a second end disposed outside the protector, the drainage being configured to produce a capillary action to drain condensed water in the protector into an exhaust pipe at the second end.

12. The drainage structure for the gas sensor according to claim 11, wherein the drainage is configured with bundled columnar wire rods.

13. The drainage structure for the gas sensor according to claim 12, wherein the protector comprises an inner protector and an outer protector that are disposed concentrically to configure an inner-outer dual structure, and the drainage is mounted to the outer protector.

14. The drainage structure for the gas sensor according to claim 13, wherein the drainage is mounted to one or both of an opening end and a side wall of the outer protector having a cylindrical shape.

15. The drainage structure for the gas sensor according to claim 11, wherein the drainage is configured with bundled capillary tubes.

16. The drainage structure for the gas sensor according to claim 15, wherein the protector comprises an inner protector and an outer protector that are disposed concentrically to configure an inner-outer dual structure, and the drainage is mounted to the outer protector.

17. The drainage structure for the gas sensor according to claim 16, wherein the drainage is mounted to one or both of an opening end and a side wall of the outer protector having a cylindrical shape.

18. The drainage structure for the gas sensor according to claim 11, wherein the protector comprises an inner protector and an outer protector that are disposed concentrically to configure an inner-outer dual structure, and the drainage is mounted to the outer protector.

19. The drainage structure for the gas sensor according to claim 18, wherein the drainage is mounted to one or both of an opening end and a side wall of the outer protector having a cylindrical shape.

20. A vehicle comprising the drainage structure for the gas sensor according to claim 11.

\* \* \* \* \*